United States Patent
Hathaway et al.

(10) Patent No.: US 10,018,271 B2
(45) Date of Patent: *Jul. 10, 2018

(54) SYSTEM FOR DETECTING PARK STATE OF A TRANSMISSION

(71) Applicant: FORD GLOBAL TECHNOLOGIES, LLC, Dearborn, MI (US)

(72) Inventors: Richard Reynolds Hathaway, Livonia, MI (US); Jeffrey James Tumavitch, Livonia, MI (US); Brian J. Deurloo, Howell, MI (US); Todd Curtis Spaulding, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 632 days.

This patent is subject to a terminal disclaimer.

(21) Appl. No.: 14/464,771

(22) Filed: Aug. 21, 2014

(65) Prior Publication Data
US 2016/0053890 A1    Feb. 25, 2016

(51) Int. Cl.
*F16H 63/48*    (2006.01)
*F16H 59/54*    (2006.01)
*F16H 59/02*    (2006.01)

(52) U.S. Cl.
CPC ......... *F16H 63/48* (2013.01); *F16H 59/0204* (2013.01); *F16H 59/54* (2013.01)

(58) Field of Classification Search
None
See application file for complete search history.

(56) References Cited

U.S. PATENT DOCUMENTS 5,696,679 A * 12/1997 Marshall ................ B60T 1/005
                                                                192/222
2013/0319155 A1    12/2013 Berger
(Continued)

FOREIGN PATENT DOCUMENTS

DE            10245386 A1     4/2004
DE       102005024468 A1    12/2006
(Continued)

OTHER PUBLICATIONS

Autopark RVAutopark.com, "Understanding Auto park parking brake actuator shaft travel", http://www.rvautopark.com/faq/understanding-auto-park-parking-brake-actuator-shaft-travel, Jun. 20, 2014, 4 pages.

*Primary Examiner* — Colby M Hansen
(74) *Attorney, Agent, or Firm* — James Dottavio; Brooks Kushman P.C.

(57) ABSTRACT

A transmission diagnostic system includes a pivotable member and an actuator. The actuator has a notch with a first side, a second side, and an opening between the two sides. The width of the opening is greater than a width of the pivotable member. The pivotable member is retained within the notch, and the actuator is configured to selectively pivot the pivotable member between an engaged position, corresponding to a PARK gear, and a disengaged position, corresponding to a gear other than PARK. The transmission diagnostic system also includes a biasing spring configured to exert a biasing torque on the pivotable member to bias the pivotable member toward the first side of the notch. The transmission diagnostic system further includes a controller configured to generate at least one diagnostic signal in response to the pivotable member not being in contact with the first side of the notch.

8 Claims, 4 Drawing Sheets

(56) References Cited

U.S. PATENT DOCUMENTS

2013/0319156 A1 12/2013 Berger et al.
2015/0308571 A1* 10/2015 Wyatt ................ F16H 63/3491
192/219.5

FOREIGN PATENT DOCUMENTS

DE    102005046610 A1    4/2007
DE    102012210571 A1    12/2013

* cited by examiner

SYSTEM FOR DETECTING PARK STATE OF A TRANSMISSION

TECHNICAL FIELD

The disclosure relates to automatic transmissions and in particular to shift-by-wire transmissions.

BACKGROUND

A traditional automatic transmission includes a transmission control device employed to control the transmission of a motor vehicle. The transmission control device is used to select several ranges, such as Park, wherein the transmission is locked to prevent the vehicle from moving, Neutral, wherein the transmission allows the vehicle to be moved freely, such as when being towed, Reverse, wherein the transmission allows the vehicle to move backwards, and one or more Drive ranges that enable forward motion of the vehicle. Usually, the transmission control device is in the form of a lever connected to the transmission via a mechanical connection, such as a cable. Typically, the lever is also connected to an indicator. As the transmission control mechanism is moved from one range to another, the mechanical connection physically shifts the transmission to the selected setting and the indicator moves to show the driver which range has been selected. Even if the vehicle is turned off, the driver is able to determine the current transmission range from the indicator and, in some cases, is able to move the transmission control mechanism to Neutral if, for example, the vehicle is to be towed.

The traditional automatic transmission utilizes multiple friction elements for automatic gear ratio shifting. Broadly speaking, these friction elements may be described as torque establishing elements, although more commonly they are referred to as clutches or brakes. The friction elements function to establish power flow paths from an internal combustion engine to a set of vehicle traction wheels. During acceleration of the vehicle, the overall speed ratio, which is the ratio of a transmission input shaft speed to a transmission output shaft speed, is reduced during a ratio upshift as vehicle speed increases for a given engine throttle setting. A downshift to achieve a higher speed ratio occurs as an engine throttle setting increases for any given vehicle speed, or when the vehicle speed decreases as the engine throttle setting is decreased. Various planetary gear configurations are found in modern automatic transmissions. However, the basic principle of shift kinematics remains similar. Shifting an automatic transmission having multiple planetary gear sets is accompanied by applying and/or releasing friction elements to change speed and torque relationships by altering the torque path through the planetary gear sets. Friction elements are usually actuated either hydraulically or mechanically based on the position of the transmission control device.

In a shift-by-wire transmission arrangement, the mechanical connection between the transmission control device and the transmission is eliminated. Instead, the transmission control device transmits an electrical signal to an electronic controller, which directs separate actuators to apply or release the various friction elements to obtain a desired gear ratio. The control device is no longer necessarily in the form of a lever because the control device is no longer moving a mechanical connection for controlling the transmission. Instead, the control device is typically an electro-mechanical interface (e.g., a series of buttons, lever or knob) that is used to instruct the transmission to switch between the transmission ranges.

SUMMARY

A transmission diagnostic system according to the present disclosure includes a pivotable member that is pivotable between an engaged position and a disengaged position. The engaged position corresponds to a PARK gear, and the disengaged position corresponds to a gear other than PARK. The transmission diagnostic system additionally includes an actuator with a notch. The notch has a first side and a second side with an opening between the two sides. The width of the opening is greater than a width of the pivotable member. The pivotable member is retained within the notch, and the actuator is configured to selectively pivot the pivotable member between the engaged position and the disengaged position. The transmission diagnostic system also includes a biasing spring configured to exert a biasing torque on the pivotable member to bias the pivotable member toward the first side of the notch. The transmission diagnostic system further includes a controller configured to generate at least one diagnostic signal in response to the pivotable member not being in contact with the first side of the notch.

In some embodiments, the at least one diagnostic signal includes a first diagnostic signal in response to the pivotable member being in the disengaged position and not being in contact with the first side of the notch. The at least one diagnostic signal may also include a second diagnostic signal in response to the pivotable member being in the engaged position and not being in contact with the first side of the notch. In some embodiments, the transmission diagnostic system additionally includes an angular position sensor, wherein the pivotable member has a pivot axis, the angular position sensor being in communication with the controller and configured to detect an angular position of the pivotable member.

A vehicle according to the present disclosure includes a transmission with a shiftable member. The shiftable member is selectively engageable with a park gear to put the vehicle in PARK. The shiftable member is movable between a nominal disengaged position, an override disengaged position, a nominal engaged position, and a diagnostic engaged position. The transmission additionally includes an actuator drivingly coupled to the shiftable member. The vehicle additionally includes at least one controller. The controller is configured to generate a first diagnostic signal in response to the shiftable member being in the override disengaged position and generate a second diagnostic signal in response to the shiftable member being in the diagnostic engaged position.

In some embodiments, the actuator includes a driven shaft movable along a drive axis between an engaged position and a disengaged position. The driven shaft has a notch along the drive axis retaining the shiftable member, and the shiftable member has a bias position and an anti-bias position relative to the notch. The shiftable member is biased toward the bias position. In such embodiments, the nominal disengaged position corresponds to the driven shaft being in the disengaged position and the shiftable member being in the bias position, the nominal engaged position corresponds to the driven shaft being in the engaged position and the shiftable member being in the bias position, the override disengaged position corresponds to the driven shaft being in the disengaged position and the shiftable member being in the anti-bias position, and the diagnostic engaged position corresponds to the driven shaft being in the engaged position and the shiftable member being in the anti-bias position.

In some embodiments the controller is further configured to control the vehicle according to a limited operating strategy in response to the first diagnostic signal. The controller may also be configured to engage a vehicle parking brake in response to the vehicle being shifted into PARK and either the first diagnostic signal or the second diagnostic signal. Some embodiments additionally include a vehicle information display. In such embodiments, the controller is further configured to signal an alert to a driver via the information display in response to the first diagnostic signal or the second diagnostic signal.

A transmission assembly according to the present disclosure includes a shiftable member configured to selectively engage or disengage a PARK gear. The transmission assembly additionally includes an actuator drivingly coupled with the shiftable member and retaining the shiftable member in a bias position or an anti-bias position and a spring configured to bias the shiftable member toward the bias position. The assembly further includes a controller configured to generate at least one diagnostic signal in response to the shiftable member being in the anti-bias position.

Some embodiments additionally include an angular position sensor. In such embodiments, the shiftable member has a first end and a second end with the first end being retained by the actuator and the second end being pivotable about a pivot axis, and the angular position sensor is in communication with the controller and configured to detect an angular position of the shiftable member. In such embodiments, the actuator may include a driven shaft movable along a drive axis, with the driven shaft defining a notch oriented along the drive axis. The notch has a first side, a second side, and a notch width. The first end of the shiftable member has a width less than the notch width and is retained by the notch. In the bias position the shiftable member contacts the first side and in the anti-bias position the shiftable member contacts the second side. In some embodiments, the actuator has an engaged position corresponding to the shiftable member engaging the PARK gear and a disengaged position corresponding to the shiftable member disengaging the PARK gear. In such embodiments, the at least one diagnostic signal comprises a first diagnostic signal in response to the shiftable member being in the anti-bias position and the actuator being in the disengaged position, and a second diagnostic signal in response to the shiftable member being in the anti-bias position and the actuator being in the engaged position.

Embodiments according to the present disclosure provide a number of advantages. For example, the present disclosure provides a diagnostic system for a transmission that provides diagnostic signals indicative of the transmission being in an override position or other diagnostic state. The present disclosure further provides a system for controlling a vehicle in response to the diagnostic signals.

The above and other advantages and features of the present disclosure will be apparent from the following detailed description of the preferred embodiments when taken in connection with the accompanying drawings.

DETAILED DESCRIPTION

Figure 1:
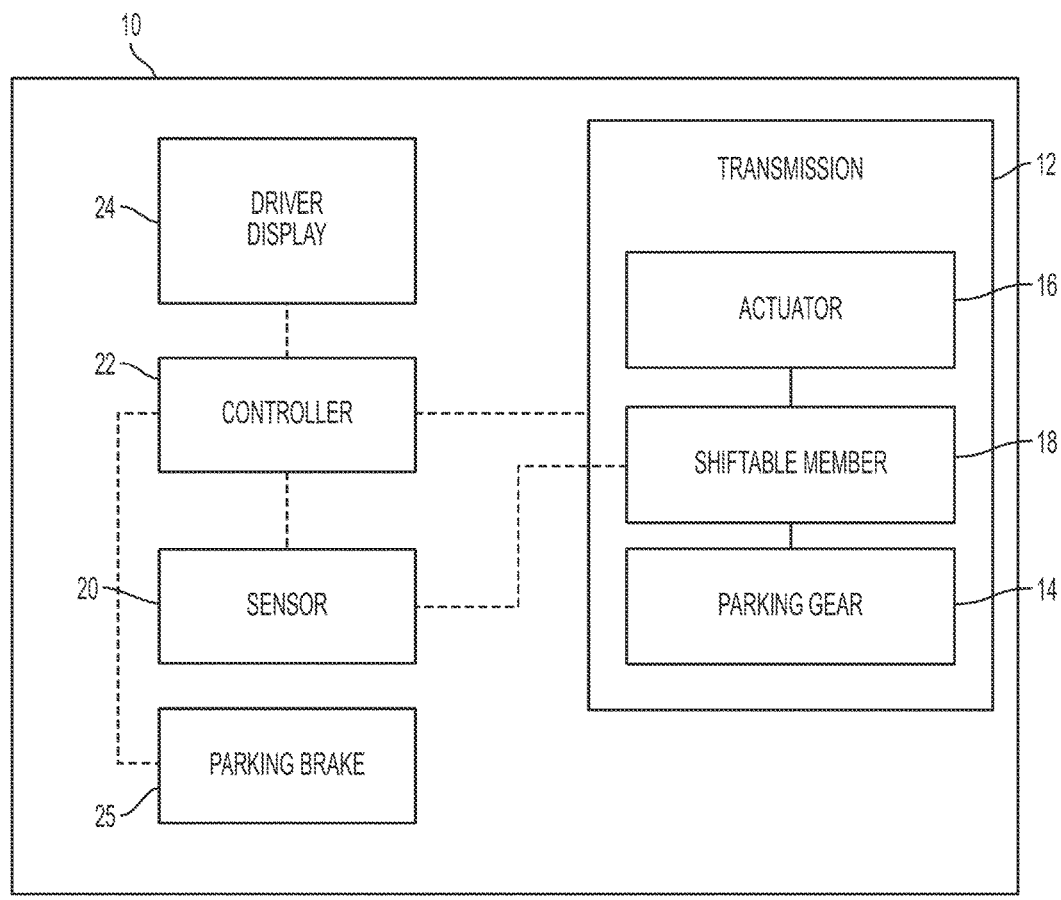
FIG. 1 is a schematic representation of a vehicle including a shift-by-wire transmission.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A shift-by-wire transmission refers to an arrangement having no mechanical connection between a transmission control device and the transmission. Instead, a user-operated gear shift module transmits an electrical signal to an electronic controller, which directs separate actuators to apply or release the various friction elements, such as clutches or brakes, to obtain a desired gear ratio. In some embodiments, the transmission may be provided with a parking pawl that is operated by one of the actuators. The parking pawl may engage with at least one gear in the transmission to inhibit vehicle motion or release from the at least one gear to permit vehicle motion. The parking pawl may be engaged in response to a driver shifting the transmission to PARK. Of course, various other parking elements may also be used to inhibit vehicle motion, such as a parking brake.

In some configurations, the actuators operating the friction elements and parking pawl are hydraulic actuators. Under normal vehicle operation, an engine drives a transmission pump to supply hydraulic pressure to the actuators and enable application or release of the friction elements. Because there is not a mechanical connection between the gear shift module and the transmission, in the absence of hydraulic pressure to the actuators, a driver will be unable to shift the transmission between gears. When the engine is off, the gear shift module may not be usable to shift gears.

Under some circumstances, however, it may be desirable to shift the vehicle from PARK to another gear without the engine running. For example, if the engine is inoperable, it may be desirable to shift the transmission out of PARK to facilitate towing. As an additional example, it may be desirable to roll the vehicle to a new location without running the engine. Using the standard gear shift module, shifting out of PARK without operating the engine is not possible. Consequently, the transmissions may be provided with a manual override mechanism. This may include a mechanism available under the vehicle hood or a cable mechanism available within the cabin. Such solutions may be difficult for a user to access, difficult to route through a vehicle, and also add complexity and cost to the vehicle. In addition, known override mechanisms that are accessible under the vehicle hood include an external override lever that moves during normal transmission operation. Such external moving parts are susceptible to mud, snow, ice, or other debris accumulating and inhibiting transmission operation.

Referring now to FIG. 1, a vehicle 10 is illustrated in schematic form. The vehicle 10 includes a shift-by-wire transmission 12. The transmission 12 includes an associated parking gear 14 that is selectively engageable to place the vehicle into PARK. The parking gear 14 may include a parking pawl selectively engageable with an associated gear in the transmission to restrain vehicle motion. The transmission 12 additionally includes at least one associated actuator 16. The actuator 16 is configured to selectively engage or disengage the parking gear 14 via a shiftable member 18. This configuration will be discussed in greater detail below. Additional actuators (not shown) may control various other friction devices, such as clutches and brakes, to selectively transmit power from a vehicle engine (not illustrated) to vehicle wheels (not illustrated) according to various gear ratios.

The vehicle 10 additionally includes a sensor 20 configured to detect a position of the shiftable member 18. The sensor 20 is in communication with or under the control of at least one controller 22. In various embodiments, the controller or controllers 22 may be a vehicle system controller or a plurality of controllers in communication with each other. The controller 22 is also in communication with or otherwise configured to control the transmission 12. The controller or controllers 22 may, of course, be in communication with various other sensors and vehicle components not illustrated in FIG. 1. The controller 22 is configured to transmit various messages and/or alerts to a driver display 24. The driver display may include a dashboard warning light, a multi-function display, an audio alert, or various other methods of communicating information to a user. The vehicle further includes a parking brake 25 in communication with or under the control of the controller 22. The parking brake 25 is preferably an electric parking brake.

Figure 2:
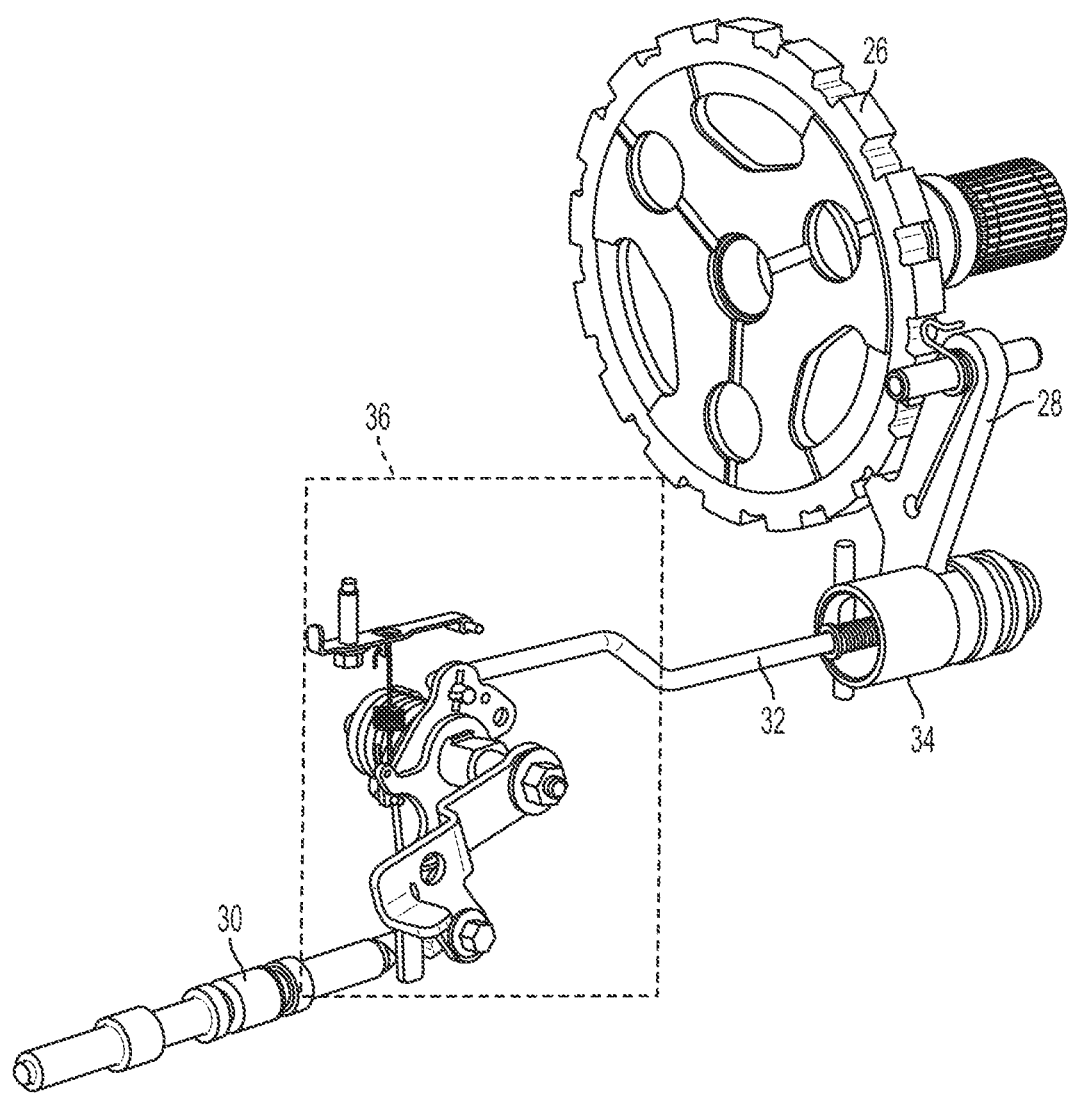
FIG. 2 is an isometric view of a parking assembly of a shift-by-wire transmission including an override system.

Referring now to FIG. 2, an isometric view of a parking assembly of a shift-by-wire transmission including an override system is illustrated. The transmission includes at least one gear set 26. A parking pawl 28 is selectively engageable with a gear of the gear set 26. When engaged, the parking pawl 28 restrains vehicle motion. An actuator 30, which may be hydraulic or electric, engages and/or disengages the parking pawl 28 via a link arm 32 and linkage 34. A parking override device 36 operably connects the actuator 30 with the link arm 32.

Figure 3:
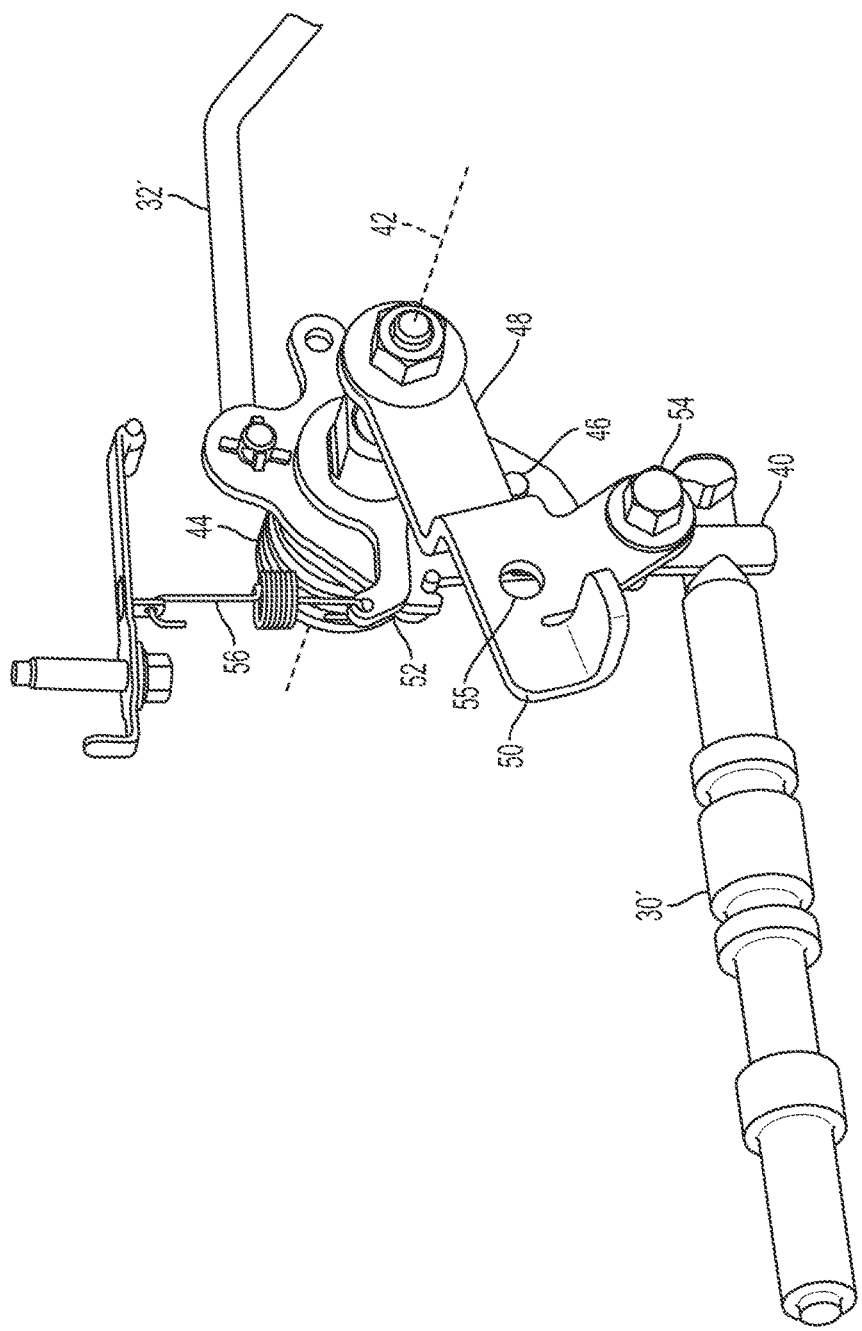
FIG. 3 is an isometric view of a parking override system.

Referring now to FIG. 3, an isometric view of a parking override assembly is illustrated. An actuator 30', which in this embodiment includes a hydraulic valve, is drivably coupled with an inner lever 40. The inner lever 40 is a shiftable member that is, at an opposite end, drivably connected to a link arm 32'. The actuator 30' is movable between various positions, including a first position, which may be a PARK position in which a parking pawl is engaged with a gear of a transmission, and a second position, which may be an out-of-PARK position in which a parking pawl is disengaged from a gear of a transmission. The inner lever 40 is configured to pivot about a pivot axis 42 in response to the actuator 30' moving among the various positions. A torsion spring 44 is configured to apply a biasing torque to the inner lever 40. The torsion spring 44 is configured to apply a biasing torque toward the PARK position, as will be discussed further below. Such an assembly may be referred to as having a "return-to-PARK" function. The inner lever additionally includes a pin 46 extending from a face opposite the torsion spring 44. It should be noted that in this context, "inner" refers to the positioning of the lever relative to a transmission case. The inner lever 40 and associated components, including the actuator 30' and link arm 32', are preferably retained within the transmission case.

The parking override assembly additionally includes an override lever 50 that is also configured to pivot about the pivot axis 42. The override lever 50 is configured to pivot between various positions, including a first position, which may be a "nominal" position for normal operation, and a second position, which may be an "override" position. The override lever 50 is positioned outside the case for ease of access. The override lever 50 is configured to pivot separately from the inner lever 40, such that as the inner lever 40 pivots between the PARK and out-of-PARK positions during normal operation, the override lever remains stationary. The override lever 50 is coupled with an actuating arm or finger 52, such that the override lever 50 and actuating arm 52 pivot together about the pivot axis 42. The actuating arm 52 is preferably retained within a transmission case. The actuating arm 52 defines a plane of pivoting motion that passes through the pin 46 of the inner lever 40. The override lever 50 includes a first fastener hole 54 with an associated fastener securing the override lever 50 to the transmission case. The override lever 50 additionally includes a second fastener hole 55. The override lever 50 may also include an extension spring 56 coupled to the actuating arm 52 and biasing the override lever 50 toward the nominal position.

Figure 4:
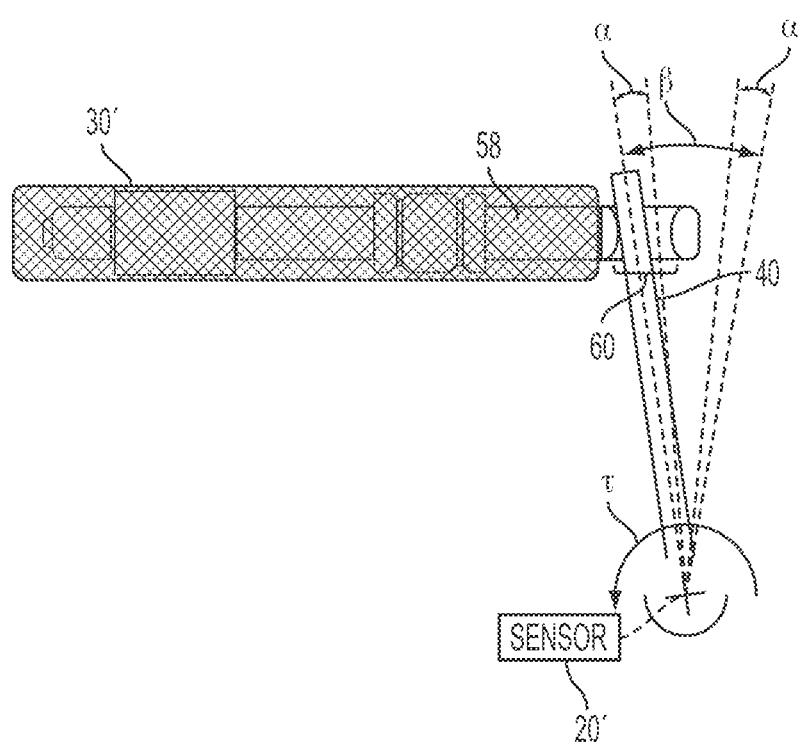
FIG. 4 illustrates operation of a parking override system and sensor.

Referring now to FIG. 4, the cooperation of the actuator 30' and inner lever 40 is shown in detail. In this view, it may be seen that the actuator 30' includes a driven shaft 58. As discussed above, the actuator 30', and more precisely the driven shaft 58, is movable between a PARK position and an out-of-PARK position. The driven shaft defines a notch 60. The inner lever 40 is retained within the notch 60.

As may be observed, the notch 60 defines an inner width that exceeds the outer width of the inner lever 40. The torsion spring 44 (not shown in this view) exerts a biasing torque τ on the inner lever 40. For a given position of the driven shaft 58 during nominal operation, the inner lever 40 is retained in a bias position, in which a first side of the inner lever 40 contacts a first side of the notch 60. At the point of contact between the first side of the inner lever 40 and the first side of the notch 60, the inner lever 40 exerts a return-to-PARK force on the driven shaft 58. When the vehicle is on and supplying hydraulic pressure to the actuator 30', the actuator 30' may overcome the return-to-PARK force may to shift the vehicle out of PARK. The biasing torque τ functions to return the actuator 30' to the PARK position in the absence of hydraulic pressure.

Under certain conditions, the inner lever 40 may move to an anti-bias position, in which a second side of the inner lever 40 contacts a second side of the notch 60. This may occur, for example, in the absence of torque from the torsion spring 44 or when a torque applied to the override lever 50 exceeds to biasing torque τ.

The bias and anti-bias positions are separated by an angular gap α. In an exemplary embodiment, α is approximately equal to four degrees. The inner lever 40 has a total angular range of travel β. In an exemplary embodiment, β is approximately equal to 18 degrees.

An angular position sensor 20' is configured to detect an angular position of the inner lever 40 relative to the pivot axis. The angular position sensor 20' is associated with a controller and configured to transmit the angular position of the inner lever 40 to the controller. In a preferred embodiment, the angular position sensor 20' comprises a dual channel sensor with a sensing range exceeding the anticipated travel range β.

Due to the selective motion of the driven shaft 58 between the PARK and out-of-PARK positions and the inner lever 40 having both a bias position and an anti-bias position relative to the notch 60, the inner lever 40 thus has at least four distinct modes or positions.

In the first position, the driven shaft 58 is in the PARK position and the inner lever 40 is in the bias position. This is a nominal PARK or nominal engaged position, in which the parking gear is engaged and the inner lever 40 is retained by the torsion spring 44 according to nominal operation.

In the second position, the driven shaft 58 is in the out-of-PARK position and the inner lever 40 is in the bias position. This is a nominal out-of-PARK or nominal disengaged position, in which the parking gear is disengaged and the inner lever 40 is retained by the torsion spring 44 according to nominal operation.

In the third position, the driven shaft 58 is in the PARK position and the inner lever 40 is in the anti-bias position. This may occur, for example, when the driven shaft 58 has moved to the out-of-PARK position and back to the PARK position in the absence of biasing torque from the torsion spring 44. This is a diagnostic PARK or diagnostic engaged position, in which the parking gear is engaged but the inner lever 40 is not retained in the nominal position. In a preferred embodiment, the associated controller is configured to signal a first diagnostic alert in response to the sensor 20' detecting the inner lever 40 in the diagnostic engaged position. The first diagnostic alert may be signaled on the driver display 24.

In the fourth position, the driven shaft 58 is in the out-of-PARK position and the inner lever 40 is in the anti-bias position. This may occur, for example, when a user applies a torque to the override lever 50, exceeding the bias spring torque τ, and shifting the override lever 50 into the override position. This is an override or diagnostic disengaged position, in which the parking gear is not engaged and the inner lever 40 is not retained in the nominal position. In a preferred embodiment, the associated controller is configured to signal a second diagnostic alert in response to the sensor 20' detecting the inner lever 40 in the diagnostic disengaged position. The second diagnostic alert may be signaled on the driver display 24.

In some embodiments, the associated controller, which may be a controller 22 as illustrated in FIG. 1, is configured to perform additional functions in addition to signaling the first or second diagnostic alerts.

In response to the inner lever 40 being detected in the diagnostic PARK position, the controller 22 may be configured to activate the parking brake 25 when the vehicle is shifted into PARK until the first diagnostic alert has been cleared. Vehicle motion is thus restrained even if the torsion spring 44 applies insufficient torque to retain the inner lever 40 in the engaged position.

In response to the inner lever 40 being detected in the override position, the controller 22 may activate a vehicle Limited Operation Strategy (LOS) mode until the second diagnostic alert has been cleared. In an LOS mode of operation, the vehicle may be driven at a limited speed and/or power. Because the vehicle would generally be operated with the inner lever in the override position only in the case of abnormal behavior of a shiftable member engaged when the vehicle is in PARK, the LOS mode preferable involves disabling any gear ratio requiring engagement of the shiftable members used in the PARK gear. As in the above example, the controller 22 may be further configured to activate the parking brake 25 when the vehicle is shifted into PARK.

As may be seen from the above description, the present disclosure provides a diagnostic system for a transmission that provides diagnostic signals indicative of the transmission being in an override position or other diagnostic state. The present disclosure further provides a system for controlling a vehicle in response to the diagnostic signals.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission assembly comprising:
   a shiftable lever configured to selectively engage or disengage a PARK gear;
   an actuator drivingly coupled to the lever via a shaft that defines a notch that retains the lever between bias and anti-bias positions;
   a spring configured to bias the shiftable lever toward the bias position; and
   a controller configured to generate at least one diagnostic alert in response to the shiftable lever being in the anti-bias position.

2. The transmission assembly of claim 1, further comprising an angular position sensor, wherein the shiftable lever has a first end and a second end, the first end being retained by the notch and the second end being pivotable about a pivot axis, and wherein the angular position sensor is configured to detect an angular position of the shiftable lever, the angular position ranging between the bias and anti-bias position, and communicate the angular position of the shiftable lever to the controller.

3. The transmission assembly of claim 2, wherein the shaft is movable along a drive axis and the notch is oriented along the drive axis, the notch having a first side, a second side, and a notch width, wherein the first end of the shiftable lever has a width less than the notch width and is retained by the notch, and wherein in the bias position the shiftable lever contacts the first side and in the anti-bias position the shiftable lever contacts the second side.

4. The transmission assembly of claim 3, wherein the actuator has an engaged position corresponding to the shiftable lever engaging the PARK gear and a disengaged position corresponding to the shiftable lever disengaging the PARK gear, and wherein at least one diagnostic alert comprises a first diagnostic alert in response to the shiftable lever being in the anti-bias position and the actuator being in the disengaged position, and a second diagnostic alert in response to the shiftable lever being in the anti-bias position and the actuator being in the engaged position.

5. The transmission assembly of claim 4, wherein the controller is further configured to limit a power input to the transmission in response to the first diagnostic alert.

6. The transmission assembly of claim 4, wherein the controller is further configured to limit a speed of the transmission in response to the first diagnostic alert.

7. The transmission assembly of claim 1, wherein the transmission is a component of a vehicle that includes a parking brake and the controller is further configured to engage the parking brake in response to the second diagnostic alert.

8. The transmission assembly of claim 1, wherein the transmission is a component of a vehicle that includes a warning light, and wherein the at least on diagnostic alert includes illuminating the warning light.

* * * * *